(12) United States Patent
Maguin (10) Patent No.: US 10,286,341 B2
(45) Date of Patent: May 14, 2019

(54) LIQUID PURIFICATION ELEMENT FOR PURIFYING A LIQUID

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 36 days.

(21) Appl. No.: 15/126,689

(22) PCT Filed: Mar. 18, 2015

(86) PCT No.: PCT/EP2015/055654
§ 371 (c)(1),
(2) Date: Sep. 16, 2016

(87) PCT Pub. No.: WO2015/140203
PCT Pub. Date: Sep. 24, 2015

(65) Prior Publication Data
US 2017/0087488 A1    Mar. 30, 2017

(30) Foreign Application Priority Data

Mar. 19, 2014   (DE) .................. 10 2014 103 715

(51) Int. Cl.
*B01D 35/02* (2006.01)
*F01N 3/20* (2006.01)
*B01D 35/027* (2006.01)
*B01D 36/00* (2006.01)

(52) U.S. Cl.
CPC ....... *B01D 35/0273* (2013.01); *B01D 36/001* (2013.01); *F01N 3/2066* (2013.01); *F01N 2610/1406* (2013.01)

(58) Field of Classification Search
CPC . B01D 35/0273; B01D 36/001; F01N 3/2066; F01N 2610/1406
USPC .......................................................... 60/301
See application file for complete search history.

(56) References Cited

U.S. PATENT DOCUMENTS

| | | | |
|---|---|---|---|
| 5,562,825 A | 10/1996 | Yamada et al. |
| 5,647,329 A | 7/1997 | Bucci et al. |
| 5,804,280 A | 9/1998 | Pall et al. |
| 5,902,480 A | 5/1999 | Chilton et al. |
| 7,029,582 B2 | 4/2006 | Sato et al. |

(Continued)

FOREIGN PATENT DOCUMENTS

| | | |
|---|---|---|
| CN | 1100776 A | 3/1995 |
| DE | 19905969 A1 | 8/2000 |

(Continued)

*Primary Examiner* — Mark A Laurenzi
*Assistant Examiner* — Kelsey L Stanek
(74) *Attorney, Agent, or Firm* — Laurence A. Greenberg; Werner H. Stemer; Ralph E. Locher (57) ABSTRACT

A multi-layer liquid purification element includes a liquid permeable top layer and a liquid-impermeable base layer. The base layer has a suction port for drawing liquid through the liquid purifying element. At least the top layer and the base layer are interconnected by a connection. The base layer has a structured surface directed at least partially toward the top layer. A method for producing a liquid purification element, a device for extracting a liquid additive for exhaust-gas purification from a tank and a motor vehicle, are also provided.

10 Claims, 4 Drawing Sheets

(56) References Cited

U.S. PATENT DOCUMENTS

| | | | |
|---|---|---|---|
| 9,121,324 B2 | 9/2015 | Brueck et al. | |
| 9,249,709 B2 | 2/2016 | Hodgson et al. | |
| 2005/0006300 A1* | 1/2005 | Sato .................. | B01D 35/0273 210/416.4 |
| 2013/0025269 A1* | 1/2013 | Hodgson ............... | F01N 3/2066 60/317 |
| 2014/0196421 A1 | 7/2014 | Jauss et al. | |

FOREIGN PATENT DOCUMENTS

| | | |
|---|---|---|
| DE | 602004001936 T2 | 12/2006 |
| DE | 102010014314 A1 | 10/2011 |
| DE | 102011003585 A1 | 8/2012 |
| DE | 102011112326 A1 | 3/2013 |
| WO | 9609879 A1 | 4/1996 |

* cited by examiner

LIQUID PURIFICATION ELEMENT FOR PURIFYING A LIQUID

BACKGROUND OF THE INVENTION

Field of the Invention

The invention relates to a liquid purification element for purifying a liquid. The liquid purification element is in particular suitable for filtering, and removing impurities from, a liquid additive for exhaust-gas purification (in particular a urea-water solution), and/or collecting gas bubbles that are present in the additive.

The liquid purification element may for example be used in a motor vehicle in a device for the extraction of a liquid additive from a tank. Liquid additives are used in motor vehicles for example for exhaust-gas purification, in order to reduce the nitrogen oxide compounds in the exhaust gas of an internal combustion engine. This is referred to as the method of selective catalytic reduction (SCR method). In the SCR method, urea-water solution is normally used as liquid additive. A 32.5% urea-water solution for exhaust-gas purification is available under the trade name AdBlue®. To carry out the SCR method, the urea-water solution is converted into ammonia. The nitrogen oxide compounds in the exhaust gas then react with the ammonia to form non-hazardous substances, such as $CO_2$, $H_2O$ and $N_2$.

A problem with the supply of liquid additive for exhaust-gas purification is that liquid additives of said type may contain impurities. Impurities in urea-water solutions are for example particles that have passed into a tank during a tank filling process. A further group of impurities are crystalline urea precipitates. Furthermore, gas bubbles may form owing to temperature fluctuations and/or movements of the liquid additive, which gas bubbles may in particular be detrimental to precise dosing or delivery of the liquid additive.

Said impurities or gas bubbles can cause damage to, or at least impair the functionality of, a device for the extraction and delivery of the liquid additive. Impurities in the liquid additive may also cause problems in the exhaust-gas treatment device. This is the case in particular if the impurities are solid (non-redissolvable) particles. Such impurities may have an aggressive effect in an exhaust-gas treatment device, and cause increased wear therein.

Against this background, it is advantageous to use a liquid purification element by means of which the liquid additive is filtered or purified before it passes into a device for the extraction, delivery and supply of the liquid additive.

A problem with a liquid purification element of said type is that it can become blocked. It is therefore advantageous for a liquid purification element to be exchangeable and restorable. The liquid purification element should be capable of operating for as long a period of time as possible without becoming blocked.

BRIEF SUMMARY OF THE INVENTION

Taking this as a starting point, it is an object of the present invention to solve or at least alleviate the technical problems highlighted in connection with the prior art. It is sought in particular to specify a particularly advantageous liquid purification element which is suitable for the purification of liquid additive for exhaust-gas purification (such as urea-water solution).

Said objects are achieved by means of a liquid purification element described below. Further advantageous refinements of the liquid purification element are specified below as well.

The features specified individually in the patent claims may be combined with one another in any desired technologically meaningful way and may be supplemented by explanatory facts from the description, with further design variants of the invention being specified.

Accordingly, there is proposed a multi-layer liquid purification element having a liquid-permeable top layer and having a liquid-impermeable base layer, wherein the base layer has a suction port for the drawing-in of liquid through the liquid purification element, and at least the top layer and the base layer are connected to one another by means of a connection, wherein the base layer has a surface which is at least partially structured toward the top layer.

The liquid purification element preferably constitutes a substantially areal or altogether slightly curved element which has a thickness significantly smaller than the maximum areal extent along the top layer or along the base layer. The liquid purification element is preferably flexible. It can thus be (plastically and/or elastically) deformed and in particular bent. The liquid purification element may in particular be adapted to the surface of a (cylindrical) housing or to the surface of a tank, wherein said liquid purification element either maintains said shape in a dimensionally stable manner and/or is guided in corresponding brackets. The liquid purification element can also be deformed if the liquid freezes, and thus yields to the ice pressure and the associated volume expansion. Said liquid purification element can in particular be expanded if the liquid in the interior of the liquid purification element freezes (and thus itself expands).

The liquid purification element is suitable for liquid to be drawn in through the (preferably single) suction port. The suction port may be in the form of a (single) opening in the base layer, if appropriate with a protruding attachment connector (for example in the manner of a cylindrical projection). Furthermore, the base layer is not permeable to the liquid, such that said liquid is delivered in a targeted manner only via the suction port (or else a multiplicity of suction ports, said number preferably being limited to two, three or four). The liquid purification element can pass through the liquid-permeable top layer (which in particular covers a large area) into the liquid purification element, and can subsequently flow between the top layer and the base layer (also) to the suction port. It is preferable if, for this purpose, there is an areal connecting chamber between the top layer and the base layer. The liquid purification element is preferably configured such that a liquid-permeable flow path to the suction port exists from every location in the top layer. In a preferred design variant, the suction port is arranged close to the connection. The suction port is preferably arranged with a spacing of less than 2 cm (centimeters) and particularly preferably less than 1 cm (centimeter) to the connection. If the liquid purification element is arranged in the tank, the suction port is preferably positioned on an upper region of the liquid purification element. This has the result that the liquid is drawn to the suction port through the liquid purification element from bottom to top. The liquid purification element preferably exhibits selective permeability for a certain liquid. In particular, it is advantageous for the liquid purification element to exhibit high permeability for urea-water solution and low permeability for air. Such selective permeability may be provided by at least one of the layers of the liquid purification element (for example the top layer). The selective permeability makes it possible for the liquid to be provided at the suction port in highly pure form, even if the surface of the top layer is only partially wetted by the liquid. In particular, it is possible for urea-water solution to be provided at the suction port (practically) without (disruptive) air bubbles if the liquid is urea-water solution, this being the case even if the surface of the top layer is only partially wetted with urea-water solution.

The liquid-permeable top layer may for example be formed by a perforated foil material and/or by a flexible grate. The liquid-permeable top layer preferably comprises a polymer material. The liquid-permeable top layer may however also be composed of a metallic material.

The liquid-impermeable base layer is preferably formed from a foil material and/or from a flexible plate. The liquid-impermeable base layer preferably likewise comprises a polymer material; said base layer may however also be composed of a metallic material. In a particularly preferred design variant, the liquid-impermeable base layer may also be implemented as a pre-shaped foil structure or as a pre-shaped shell structure. Such a pre-shaped foil or shell structure may be produced from a starting material for example by means of a press-moulding method, in particular a hot press-moulding method. As a starting material, use may be made of a plastic, for example.

The liquid-permeable top layer and the liquid-impermeable base layer are particularly preferably manufactured from the same material. In any case, for usage with a urea-water solution, corresponding resistance and if appropriate also a certain degree of "flexibility" in the case of ice pressure being generated in the event of freezing are (in each case) advantageous.

The connection is in particular liquid-impermeable and may also be referred to as a "liquid-impermeable connection". The connection may however also be at least partially permeable to the liquid. It is important that the connection prevents contaminants from passing between the top layer and the base layer. The connection is formed by an encircling connecting seam that connects the top layer and the base layer to one another in the edge regions thereof. Here, the expression "encircling" means in particular that the connection forms a closed linear portion on the multi-layer, flexible liquid purification element. The connection encircles in particular a location on the liquid purification element at which the suction port is provided. The connection is preferably formed in an edge region of the (areal) liquid purification element.

The connecting chamber (already described further above) between the top layer and the base layer is formed in particular by the structured surface of the base layer, which extends into the connecting chamber in the direction of the top layer or even as far as the adjacent layer. By means of the structured surface of the base layer, it is possible at least in regions for a spacing to be generated between the base layer and the top layer. Said spacing has the effect that, between the top layer and the base layer, there is the connecting chamber which realizes at least one targeted flow path from the top layer to the suction port. It is particularly preferable for the connecting chamber to be configured such that a targeted flow path to the suction port exists from every location in the top layer. The structured surface of the base layer may for example jointly form a predefinable arrangement of multiple channels, chambers or the like in the connecting chamber. The structured surface of the base layer is in particular formed in an inner region which is spaced apart from an edge (and the suction port) of the base layer.

The multi-layer liquid purification element preferably has at least one additional, separate insert which is arranged between the top layer and the base layer. The liquid purification element is thus now formed with three layers that are connected to one another. Said additional, separate insert may perform a liquid purification function in order to ensure particularly effective purification of the liquid. It is preferable for the at least one separate insert in the connection to be connected to the top layer and to the base layer. The additional, separate insert may also be a support layer which may be configured or selected so as to maintain the presence of the connecting chamber between the top layer and the base layer even in the event of a deformation of the liquid purification element, and/or to realize at least one targeted flow path from the top layer to the suction port.

The liquid purification element is particularly preferable if at least one separate insert is arranged between the top layer and the base layer, wherein the at least one separate insert comprises at least one filter layer.

It is also advantageous for the filter layer to comprise at least one of the following materials: a nonwoven material, a sponge material, a grate, a screen, a fabric and a mesh.

By means of a filter layer as a separate insert within the multi-layer liquid purification element, it is possible for particles to be constantly filtered out of the liquid. The filter layer preferably has a depth filter characteristic. This means that impurities in the liquid are deposited within the filter layer and do not merely remain on a surface of the filter layer. This distinguishes a filter layer with depth filter characteristics for example from a screen, which normally exhibits only limited permeability to particularly large impurities, such that said impurities are deposited on a surface of the screen. A filter layer may for example be constructed from a nonwoven material which is composed of polymer fibres and which is produced for example by pressing and/or sintering. In the case of a nonwoven, the fibres may be in a chaotic and/or ordered arrangement, such that said expression in this case also encompasses, in particular, fabrics and the like. The filter layer may also partially be produced in a spraying process in which filter fibres are spun and sprayed onto a substrate.

In a further preferred design variant of the described liquid purification element, it is also possible for a filter layer to be formed by the top layer. The top layer may have all of the above-described characteristics of a filter layer. If the top layer is in the form of a filter layer, it may be provided that no further separate insert is arranged within the liquid purification element, and thus the top layer that is designed as a filter layer rests directly on the liquid-impermeable base layer.

It is also advantageous if a support layer is arranged, as at least one separate insert, between the top layer and the base layer.

Here, a support layer refers in particular to a structure which does not exhibit a purification action or filtering action for the liquid, said structure rather merely having the task of forming an areal connecting chamber between the top layer and the base layer, and in particular between a filter layer and the base layer, in order that a free flow of liquid to the suction port is possible from every location in the liquid purification element. To form a connecting chamber, a support layer may be provided in addition to the structured surface of the base layer. The support layer may in particular also be situated between the base layer and a filter layer in the liquid purification element.

It is also preferable for multiple separate inserts to be provided within the liquid purification element, which inserts in each case separately realize liquid purification functions (filter layers) and supporting functions (support layers).

It is also advantageous if at least two support layers having aligned passages are provided, wherein the passages of the at least two support layers are oriented in different directions and the passages of the at least two support layers overlap with one another, and thus an areal duct system is formed. An areal duct system forms a connecting chamber which ensures the free throughflow capacity between the top layer and the base layer.

It is however also particularly preferable for the structured surface of the base layer to form an areal duct system between the base layer and the top layer.

The base layer may form an areal duct system for example by means of elevations and depressions of the structured surface, which elevations and depressions generate a spacing between the base layer and the top layer or between the base layer and the further separate inserts provided between the base layer and top layer. Owing to said spacing, a duct system is formed between the elevations, which duct system forms the connecting chamber already described further above.

Furthermore, it is also possible for at least one gas bubble reservoir to be formed between the base layer and the top layer by the structured surface of the base layer. When the liquid purification element is in the installed position, said gas bubble reservoir is in particular arranged such that a (gravimetric) migration of the gas bubbles contained in the liquid into said gas bubble reservoir is promoted, and thus the gas bubbles can be removed from a duct-type delivery system which is formed.

The liquid purification element is particularly advantageous if the base layer has a multiplicity of at least one of the following structures, which generate a spacing between the at least one separate insert and the base layer:
studs,
elevations,
ducts.

Studs refer to substantially punctiform or circular, spatially delimited protuberances of the base layer toward the top layer, which protuberances ensure the presence of a spacing between the base layer and the top layer. Elevations refer to relatively large (for example also areal and/or linear) protuberances of the base layer in the direction of the top layer, which protuberances may for example also be referred to as wave peaks. Ducts are depressions in the base layer which each provide, in particular between the studs/elevations, a flow path between the top layer and the base layer. By means of the various structures (studs, elevations and ducts) and a suitable arrangement of said structures on the base layer, it can be achieved that even a directed throughflow capacity of the connecting chamber between the base layer and the top layer, from the various positions in the top layer to the suction port, can be ensured. In particular, it is possible for the throughflow capacity of the connecting chamber between the base layer and the top layer to the suction port to be increased, such that the throughflow capacity of the connecting chamber is adapted to the liquid flows occurring in each case in the connecting chamber, and the flow speeds within the entire connecting chamber of the liquid purification element are substantially constant. Since all of the liquid that is purified by the liquid purification element flows through those regions of the liquid purification element that are in the direct vicinity of the suction port, and in each case only a very small fraction of the liquid flows at a great distance from the suction port, it is advantageous for the throughflow capacity to be increased in the vicinity of the suction port. For example, it is possible for a locally delimited support layer to be provided in the vicinity of the suction port, which locally delimited support layer does not extend over the entire area of the liquid purification element and enlarges the connecting chamber in the vicinity of the suction port.

Furthermore, the liquid purification element is advantageous if the support layer has an encircling stepped edge at which the connection is formed.

It is particularly advantageously possible for a welded connection to be formed at a stepped (exposed or protruding) edge of said type. A stepped edge of said type can be produced particularly easily if the base layer is produced by means of a press-moulding method. It is preferable for a stepped edge of said type to also be provided on the top layer. The stepped edges of the base layer and of the top layer preferably fit exactly with one another.

Furthermore, the liquid purification element is advantageous if the suction port is formed by an opening in the base layer with a cylindrical projection.

By way of the suction port, the liquid purification element can be connected to an extraction port on a device for the extraction and/or delivery of a liquid. It is particularly advantageous for the opening to be punched or similar out of the material of the base layer, and for the cylindrical projection to be adhesively bonded or welded to the base layer. The cylindrical projection is preferably composed of a polymer material. The cylindrical projection may also be jointly formed by means of a press-moulding method during the production of the base layer. The cylindrical projection preferably engages into a suction port of a device for the extraction and/or for the delivery of a liquid, and is sealed off in a fluid-tight manner with said suction port, such that all of the liquid that is drawn in through the suction port passes through the liquid purification element and is accordingly purified.

It is furthermore advantageous if the connection is formed with a weld seam by means of which at least the top layer and the base layer are connected to one another.

A weld seam of said type may particularly preferably be formed on the encircling stepped edge of the base layer.

It is also particularly preferable for at least one separate insert to be connected via said weld seam to the top layer and/or to the base layer. It is very particularly preferable for all of the inserts of the multi-layer liquid purification element to be connected to one another in this way. It is also particularly preferable for both the top layer and also the base layer to be composed of the same polymer material. The welded connection may be produced for example by means of a roller seam welding process in which a hot body that generates the welding action is moved along the connection over the top layer and over the base layer in order to weld the top layer and the base layer to one another in the region of the connection. It is preferable for a separate insert that is arranged between the top layer and the base layer to likewise be welded to the top layer and/or to the base layer during the welding process. The at least one separate insert preferably has material properties that permit simultaneous welding to the top layer and to the base layer.

A welding process is not the only possibility for forming a connection on the liquid purification element. The liquid-impermeable connection may for example comprise an adhesive connection or a clamped connection. It is likewise possible for different connecting techniques (welding, adhesive bonding, clamping etc.) to be combined with one another to form the connection.

The invention also proposes a production method for the production of a liquid purification element, said production method having at least the following steps:

a) providing a liquid-permeable top layer;

b) providing a liquid-impermeable base layer with a structured surface;

c) forming a connection of at least the top layer and the base layer; and d) forming a suction port on the base layer.

It is particularly preferable if, between step b) and step d), in a method step b.2), at least one further separate insert is also provided between the liquid-permeable top layer and the liquid-impermeable base layer. Said at least one further separate insert may for example be a filter layer or a support layer.

The described production method is particularly suitable for producing the liquid purification element proposed here, as is described in detail further above. All of the advantages and special technical design features described further above in conjunction with the liquid purification element can be transferred analogously to the production method. The same applies to the advantages and design features of the production method highlighted below, which can be transferred analogously to the liquid purification element.

The sequence of the method steps a) to d) is not binding. If technically expedient, the sequence of method steps a) to d) may be changed. It is likewise possible, if appropriate, for the method steps to be performed at least partially simultaneously.

With this production method, it is possible in particular to produce a large number of liquid purification elements from starting materials for the top layer, the base layer and, if appropriate, the further layers. Here, the starting materials may be provided in each case in the form of endless pieces of material or material strips (for example in the form of coils). The starting materials are laid one on top of the other, and the connections are subsequently produced.

It is particularly preferable for a deformation of the liquid-impermeable base layer (deformation step) to also take place in a step b.1) between step b) and step c). It is preferably the case that, in the deformation step b.1), the liquid-impermeable base layer is provided with a structured surface. It is very particularly preferable for a press-moulding method to be used in the deformation step b.1). Here, the starting materials are laid one on top of the other, and the connections are subsequently produced.

If the starting materials for the individual layers are provided in the form of endless pieces of material or material strips, an additional method step c.1) may then be necessary in which in each case one section of the starting materials is cut off from the endless pieces of material or the material strips. Said step c.1) may for example be performed before or after step c).

In a particularly preferred design variant of the described method, connections for a multiplicity of liquid purification elements are provided in step d). Said multiplicity of liquid purification elements may be provided adjacent to one another and/or one behind the other on the starting material for the top layer, the base layer and/or the separate insert that may be provided. The individual liquid purification elements are subsequently separated from one another. The described method also makes it possible in particular for liquid purification elements of different surface area or different size to be produced from common starting materials.

Furthermore, step d) may be performed in two sub-steps: Accordingly, in step d.1), an opening can be formed into the top layer, and in step d.2), a projection can be joined on. Step d.1) may for example be performed before step c), while step d.1) may if appropriate also be performed after and/or partially at the same time as step d). It is also particularly preferable for step d) to be performed already during the provision of the liquid-impermeable base layer. This may take place for example during the course of a press-moulding method or hot press-moulding method in which the structured surface is introduced into the base layer.

Also specified here is a device for the extraction of a liquid additive for exhaust-gas purification from a tank, having a housing for installation in the tank, the housing having an extraction port to which a liquid purification element is connected by way of the suction port, wherein the device is suitable, and set up, for extracting liquid additive from the tank through the liquid purification element.

The housing preferably constitutes an encapsulation of the device with respect to the tank interior. The device and the housing of the device are formed such that the device can be inserted into an opening in a tank wall of a tank, and in particular into an opening in a tank base. Then, one portion of the housing is oriented toward an interior of the tank, whereas a further portion of the housing is implemented toward an outer side of the tank. It is preferable for a supply port, via which the device can supply the liquid to a consumer, to be situated on the portion of the housing on the outer side of the tank. The extraction port already described is oriented toward the interior of the tank. The described liquid purification element is formed at said extraction port. The liquid purification element is preferably adapted to an external shape of the housing and lies against the housing. For this reason, it is particularly advantageous for the liquid purification element to be flexible. The liquid purification element can then be bent around a portion of the housing. The liquid purification element may be adhesively bonded or welded to the housing. It is also possible for the liquid purification element to be inserted into a receptacle on the housing. Furthermore, there may also be provided a cover element by means of which the liquid purification element is fixed to the housing. It is preferable for a line to extend within the housing from the extraction port to the supply port, through which line the liquid additive can be delivered. On said line there is arranged a pump which performs the delivery and if appropriate also the dosing of the liquid additive.

The above-described configuration with receptacle and cover element represents only one example for an assembly of the liquid purification element. In a further design variant, it is also possible for the liquid purification element to (only) be welded to the housing. It is also possible for the liquid purification element to be fastened to the housing not over a large area but rather only by means of a local fastening at the suction port, for example such that the liquid purification element is arranged in a freely movable and/or flexible manner in the tank. For example, it is possible for a liquid purification element or a multiplicity of liquid purification elements to have protruding arms which extend into the tank from a housing of the device for the extraction of a liquid. The liquid purification element can thus be used in a highly versatile manner.

The liquid purification element of the device is preferably exchangeable. The suction port of the liquid purification element may be adhesively bonded to, plugged onto or connected by means of a welded connection to the extraction port of the device.

The invention is used in particular in a motor vehicle having an internal combustion engine, an exhaust-gas treatment device for the purification of the exhaust gases of the internal combustion engine, a tank for storing a liquid additive, and the device described here for the extraction of the liquid additive from the tank and for the supply of the liquid additive to the exhaust-gas treatment device.

In the exhaust-gas treatment device, which is assigned in particular to an internal combustion engine that is operated with an excess of air (for example a diesel engine), there is preferably arranged an SCR catalytic converter by means of which the exhaust-gas purification method of selective catalytic reduction can be performed. The liquid additive for the SCR method (in particular urea-water solution) can be supplied to the exhaust-gas treatment device preferably by means of an injector that is connected to the device via a line.

BRIEF DESCRIPTION OF THE SEVERAL VIEWS OF THE DRAWING

The invention and the technical field will be explained in more detail below on the basis of the figure. It should be noted that the figures illustrate particularly preferred exemplary embodiments, to which the invention is however not restricted. The features shown in the figures, and in particular the illustrated proportions, are merely schematic. In the figures.

DESCRIPTION OF THE INVENTION

Figure 1:
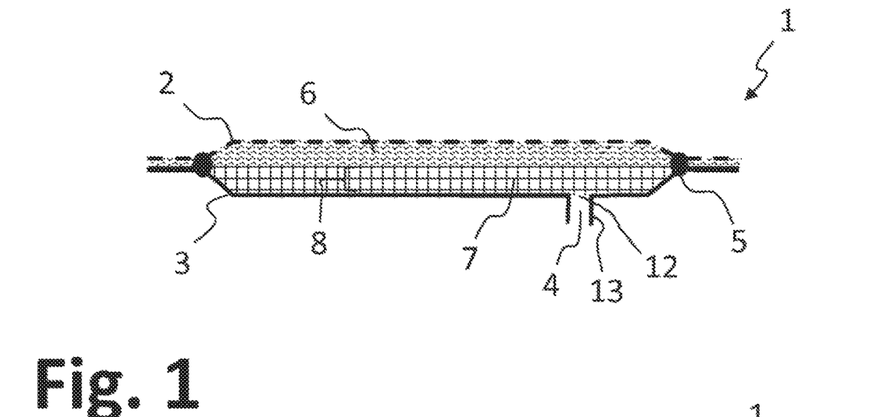
FIG. 1: shows a first design variant of a liquid purification element.
Figure 2:
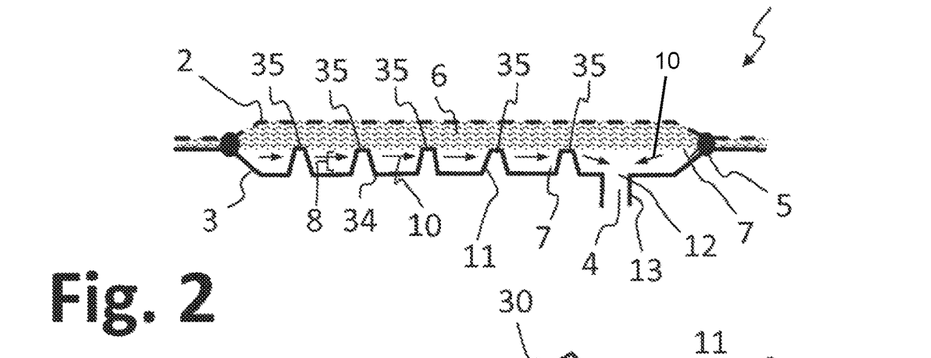
FIG. 2: shows a second design variant of a liquid purification element.

FIGS. 1 and 2 illustrate in each case a liquid purification element 1 which has a base layer 3 and a top layer 2 which are connected to one another by means of an encircling connection 5 (which forms, for example, a type of quadrangle). The top layer 2 is (preferably entirely or predominantly) permeable to liquid (in the region within the connection) in order that liquid can be drawn into the liquid purification element 1. The base layer 3 has a (single) suction port 4 to which an extraction port of a device for the extraction and delivery of liquid additive from a tank can be connected. The suction port 4 is preferably formed by an opening 12 in the base layer 3 and by a cylindrical projection 13 on the base layer 3. Between the top layer 2 and the base layer 3 there is preferably situated a (single) filter layer 6 by means of which the liquid passing through the top layer 2 into the liquid purification element 1 can be purified. The filter layer 6 may also be omitted. The top layer 2, for example, may perform a filter function instead.

In the design variant according to FIG. 1, between the filter layer 6 and the base layer 3, there is preferably arranged (at least) one support layer 7 which ensures the presence of an areal connecting chamber 8 between the filter layer 6 and the base layer 3, which connecting chamber ensures that liquid can flow to the suction port 4 from every location of the filter layer 6 or of the top layer 2.

Both the filter layer 6 and also the support layer 7 are labelled as separate inserts in the liquid purification element.

In the design variant according to FIG. 2, there is no support layer. Here, the base layer 3 is formed with a structured surface 34. In the specific case illustrated here (to which the invention is not restricted), the structured surface 34 of the base layer 3 has studs 35. Said studs 35 generate a connecting chamber 8 between the base layer 3 and the top layer 2 or the base layer 3 or between the base layer 3 and the filter layer 6. Said connecting chamber 8 may also be referred to as an areal duct system 11 which permits a flow of liquid to the suction port 4 from every location in the top layer 2.

Figure 3:
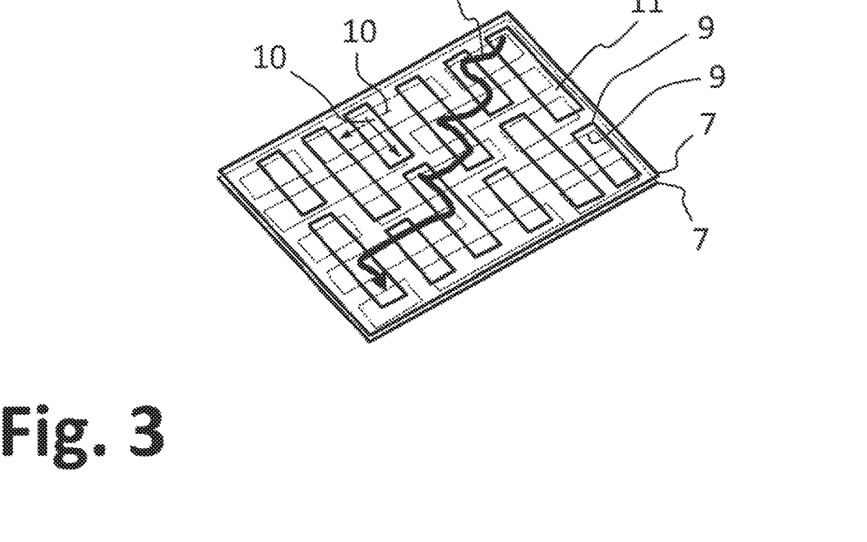
FIG. 3: shows a construction with two support layers for a liquid purification element.

FIG. 3 shows, by way of example, a possible construction of support layers 7. Said figure illustrates two support layers 7 which each have passages 9 which are oriented in different directions 10 and which overlap or intersect and thus form an areal duct system 11. Said areal duct system 11 can act as a connecting chamber within the liquid purification element 1 if the support layers 7 are (as illustrated) provided in a liquid purification element. This permits a liquid flow 30 to the suction port on the base layer from every location in the liquid purification element. The top layer and/or the filter layer can accordingly be impinged on by flow over a large area, and all of the liquid that impinges on the top layer and/or the filter layer can be conducted to the suction port.

Figure 4:
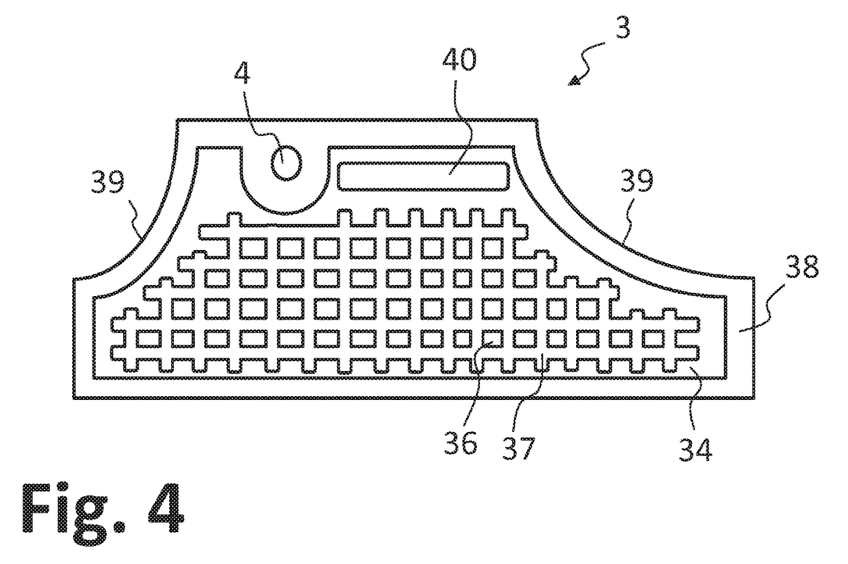
FIG. 4: shows a first design variant of a base layer for a liquid purification element.

FIG. 4 shows a first design variant of a base layer 3. It can be seen that the base layer 3 has a pre-shaped form which may for example be adapted to an available installation area. The base layer 3 may for example have recesses 39 which are adapted to the available installation space for the liquid purification element. Furthermore, the base layer 3 has a stepped edge 38 which is suitable for the formation of a connection which may for example be in the form of a welded connection. The suction port 4 is also arranged on the base layer 3.

Figure 5:
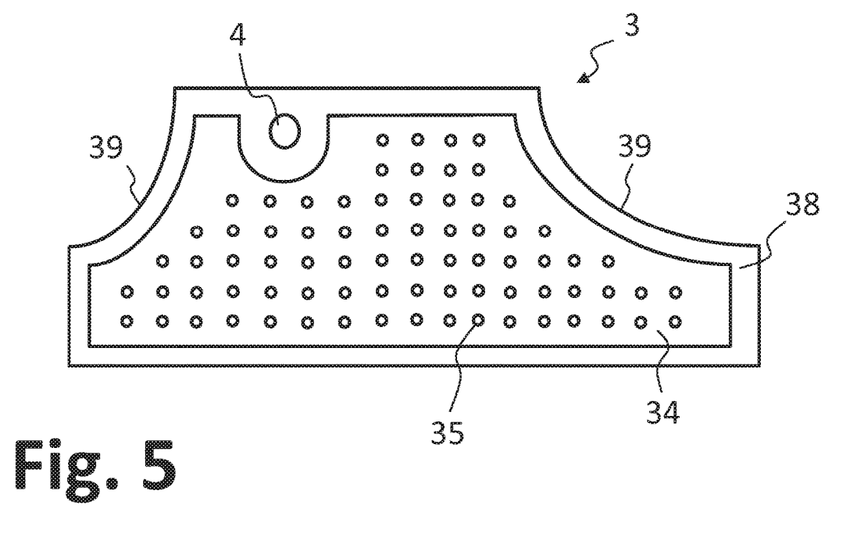
FIG. 5: shows a second design variant of a base layer for a liquid purification element.

FIGS. 4 and 5 each show different structured surfaces 34 of the base layer 3. FIG. 4 shows a system composed of ducts 37 and elevations 36, which system is suitable for ensuring the presence of a connecting chamber. FIG. 5 shows a regular pattern of studs 35, which is likewise suitable for ensuring the presence of a connecting chamber. FIG. 4 additionally shows an air collecting duct 40, which may also generally be referred to, or function as, a gas bubble reservoir. An air collecting duct 40 of said type may be formed by a special depression within the base layer 3, and serves to capture air or other gas bubbles that pass into or are formed in the liquid purification element, such that said bubbles do not pass to the suction port of the liquid purification element.

Each of FIGS. 4 and 5 illustrate that the stepped edge 38 also extends around the suction port 4. This does not mean that flow cannot pass to the suction port 4. It is intended merely to illustrate that special stiffening of the base layer 3 is provided here, which protects the suction port 4 against deformation.

Figure 6:
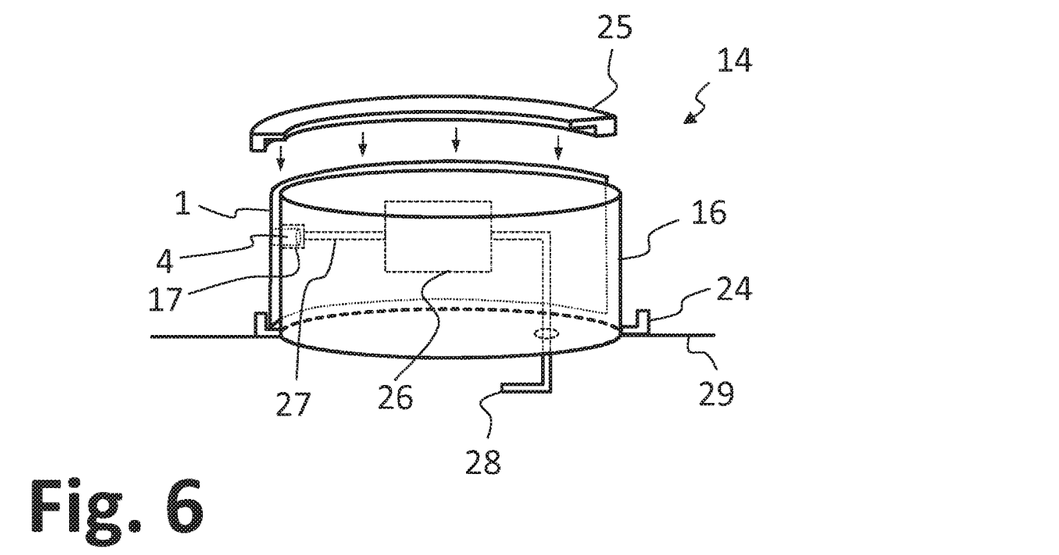
FIG. 6: shows a device for the extraction of a liquid additive from a tank with a liquid purification element.

FIG. 6 shows a device 14 for the extraction of a liquid additive for exhaust-gas purification (in particular urea-water solution) from a tank 15. In figure 6, only the tank base 29 into which the device 14 or the housing 16 of the device 14 is inserted is illustrated. On the tank 15 there is provided an extraction port 17 through which liquid can be drawn out of the tank. The suction port 4 of a described liquid purification element 1 is connected to the extraction port 17 such that liquid can be drawn through the liquid purification element 1 into the extraction port 17. A suction line 27 runs from the extraction port 17 to a pump 26 arranged in the housing 16. The liquid delivered by the pump 26 is supplied by the device 14 at the supply port 28. The supply port 28 may have connected to it a line (not illustrated here) which leads to an injector. The liquid purification element 1 is arranged on the device 14 in a receptacle 24 and is adapted to an outer surface of the housing 16. Furthermore, a cover element 25 may be provided which permanently fixes the liquid purification element 1 to the housing 16 or to the outer surface of the housing 16.

Figure 7:
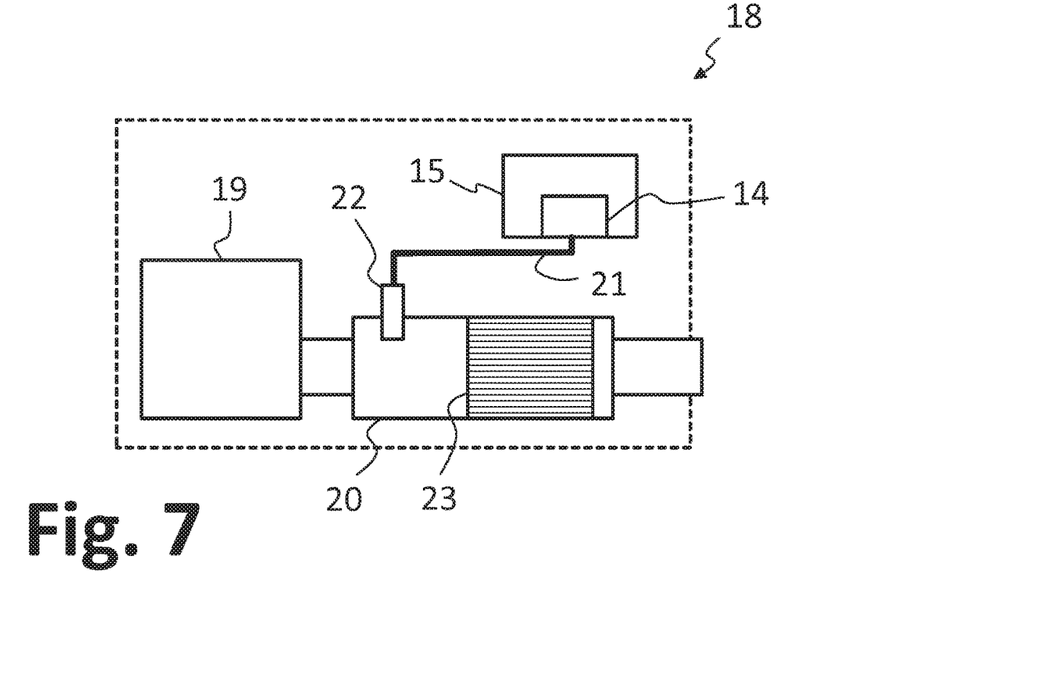
FIG. 7: shows a motor vehicle having a device for the extraction of a liquid additive from a tank.

FIG. 7 shows a motor vehicle 18 having an internal combustion engine 19 (for example a diesel engine) and having an exhaust-gas treatment device 20 for the purification of the exhaust gases of the internal combustion engine 19. In the exhaust-gas treatment device 20 there is provided an SCR catalytic converter 23 for carrying out the method of selective catalytic reduction. Liquid additive can be supplied from a tank 15 to the exhaust-gas treatment device 20 via an injector 22 and a line 21 by a device 14.

Figure 8:
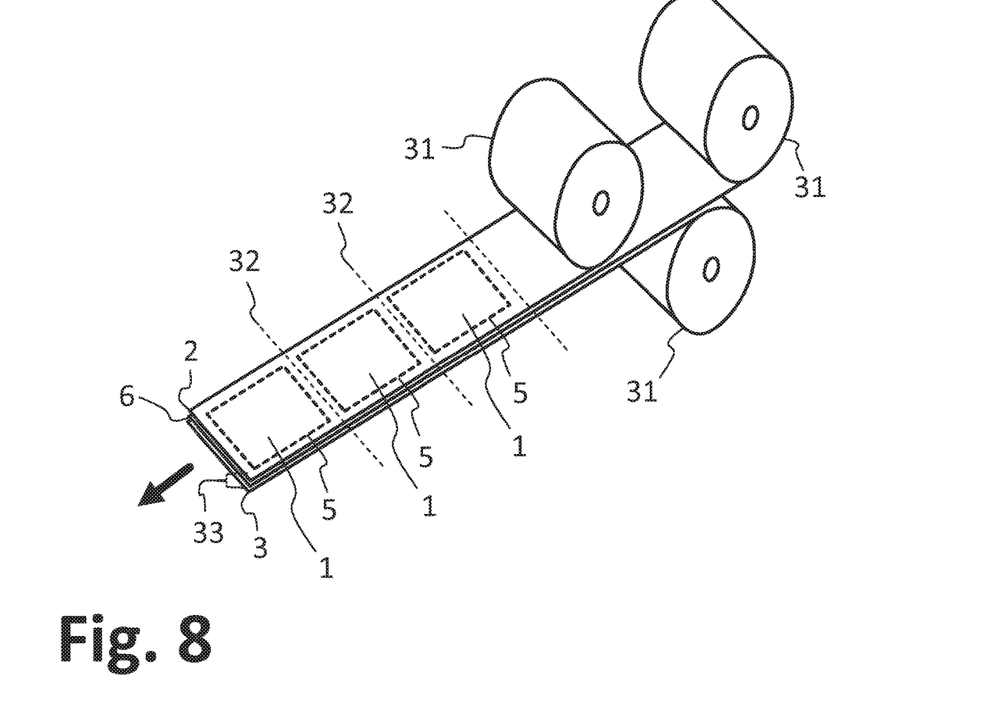
FIG. 8: illustrates a method for the production of the liquid purification element.

FIG. 8 shows a stage during a production process for the production of liquid purification elements 1. It can be seen in said figure that the top layer 2, the base layer 3 and a filter layer 6 are provided in each case in the form of an endless material strip from a coil 31. The filter layer 6 illustrated here is to be understood as an example for any desired separate insert. A support layer, for example, may additionally or alternatively also be provided between the top layer 2 and the base layer 3. The top layer 2, the filter layer 6 and the base layer 3 form a layer pack 33 which can be severed along cut lines 32 to form liquid purification elements. The connections 5 that delimit the individual liquid purification elements 1 may be produced before or after the severing of the individual liquid purification elements 1 along the cut lines 32. Furthermore, use may also be made of a moulding tool (not illustrated here) by means of which a structured surface (likewise not illustrated here) is embossed on the base layer.

By way of precaution, it is also pointed out that the combinations of technical features shown in the figures are not generally binding. For example, it is technically possible for features from one figure to be combined with other technical features from another figure and/or from the general description. The only exception to this is if the explicit combination of features has been referred to and/or a person skilled in the art identifies that the basic function of the liquid purification element and/or of the described method can no longer be realized otherwise.

LIST OF REFERENCE NUMERALS

1 Liquid purification element
2 Top layer
3 Base layer
4 Suction port
5 Connection
6 Filter layer
7 Support layer
8 Connecting chamber
9 Passage
10 Direction
11 Duct system
12 Opening
13 Cylindrical projection
14 Device
15 Tank
16 Housing
17 Extraction port
18 Motor vehicle
19 Internal combustion engine
20 Exhaust-gas treatment device
21 Line
22 Injector
23 SCR catalytic converter
24 Receptacle
25 Cover element
26 Pump
27 Suction line
28 Supply port
29 Tank base
30 Liquid flow
31 Coil
32 Cut line
33 Layer pack
34 Structured surface
35 Stud
36 Elevation
37 Ducts
38 Stepped edge
39 Recess
40 Air collecting duct

The invention claimed is:

1. A multi-layer liquid purification element, comprising:
a flexible liquid-permeable top layer being bendable around a portion of a housing for mounting the multi-layer liquid purification element;
a flexible liquid-impermeable base layer being bendable around the portion of the housing, said base layer having a suction port for drawing liquid through the multi-layer liquid purification element, and said base layer having a structured surface directed at least partially toward said top layer; and
a connection interconnecting at least said top layer and said base layer.

2. The multi-layer liquid purification element according to claim 1, which further comprises at least one separate insert disposed between said top layer and said base layer, said at least one separate insert including at least one filter layer.

3. The multi-layer liquid purification element according to claim 1, which further comprises an areal duct system formed by said structured surface and disposed between said base layer and said top layer.

4. The multi-layer liquid purification element according to claim 1, which further comprises:
at least one separate insert disposed between said top layer and said base layer;
said structured surface of said base layer having a multiplicity of structures generating a spacing between said at least one separate insert and said base layer; and
said structures being at least one of studs, elevations or ducts.

5. The multi-layer liquid purification element according to claim 1, wherein said base layer has an encircling stepped edge at which said connection is formed.

6. The multi-layer liquid purification element according to claim 1, wherein said suction port is formed by an opening in said base layer with a cylindrical projection.

7. The multi-layer liquid purification element according to claim 1, wherein said connection is formed with a weld seam interconnecting at least said top layer and said base layer.

8. A device for extracting a liquid additive for exhaust-gas purification from a tank, the device comprising:
a housing for installation in the tank;
said housing having an extraction port connected to said suction port of said multi-layer liquid purification element according to claim 1; and said suction port being configured to extract the liquid additive from the tank through said multi-layer liquid purification element.

9. A motor vehicle, comprising:
an internal combustion engine;
an exhaust-gas treatment device for purification of exhaust gases of said internal combustion engine;
a tank for storing a liquid additive; and
a device for extracting the liquid additive from said tank and for supplying the liquid additive to said exhaust-gas treatment device;
said device including a housing for installation in the tank, said housing having an extraction port connected to said suction port of a multi-layer liquid purification element according to claim 1, and said suction port being configured to extract the liquid additive from the tank through said multi-layer liquid purification element.

10. A method for producing a liquid purification element, the method comprising the following steps:
a) providing a flexible liquid-permeable top layer being bendable around a portion of a housing for mounting the multi-layer liquid purification element;
b) providing a flexible liquid-impermeable base layer being bendable around the portion of the housing and having a structured surface directed at least partially toward the top layer;
c) forming a connection of at least the top layer and the base layer; and
d) forming a suction port on the base layer for drawing liquid through the liquid purification element.

\* \* \* \* \*